United States Patent [19]

Takematsu

[11] Patent Number: 4,510,419
[45] Date of Patent: Apr. 9, 1985

[54] GRIP-TYPE PHOTOGRAPHIC FLASH DISCHARGE DEVICE

[75] Inventor: Yoshiyuki Takematsu, Tokyo, Japan

[73] Assignee: Fuji Koeki Kabushiki Kaisha, Tokyo, Japan; a part interest

[21] Appl. No.: 505,449

[22] Filed: Jun. 17, 1983

[30] Foreign Application Priority Data

Jun. 23, 1982 [JP] Japan .............................. 57/106765

[51] Int. Cl.³ .............................................. H05B 37/00
[52] U.S. Cl. .............................. 315/241 P; 315/171; 315/240; 354/145.1
[58] Field of Search ............ 354/145.1, 149.1, 149.11; 315/171, 172, 160, 241 P, 240

[56] References Cited

U.S. PATENT DOCUMENTS

| | | | |
|---|---|---|---|
| 2,738,443 | 3/1956 | Danziger | 315/241 P |
| 2,740,339 | 4/1956 | Carter | 315/241 P |
| 3,134,547 | 5/1964 | Kapteyn | 354/145.1 |
| 3,334,270 | 8/1967 | Nuckolls | 315/171 |
| 3,858,087 | 12/1974 | Tomsky et al. | 315/171 |
| 4,468,592 | 8/1984 | Ogura et al. | 315/241 P |

FOREIGN PATENT DOCUMENTS 3128436 5/1958 Japan.
3134298 7/1959 Japan.

*Primary Examiner*—Harold Dixon
*Attorney, Agent, or Firm*—Finnegan, Henderson, Farabow, Garrett & Dunner

[57] ABSTRACT

A photographic flash device comprising a grip portion and a flash unit removably attachable thereto. Both the grip portion and flash unit house battery-powered DC-DC converters which cooperate upon attachment of the flash unit to the grip portion in charging a main discharge capacitor. A source switch permits charging of the discharge capacitor by only one of the DC-DC converters, and a safety switch prevents operation of at least one of the converters when the flash unit is not attached to the grip portion.

4 Claims, 4 Drawing Figures

GRIP-TYPE PHOTOGRAPHIC FLASH DISCHARGE DEVICE

BACKGROUND OF THE INVENTION

1. Field of the Invention

The present invention relates to photographic flash discharge devices of the grip type.

2. Background Art

Grip-type flash discharge devices are well known flash devices adapted to be mounted on a camera using a bracket and a clamp screw threaded into the threaded hole formed in the bottom of the camera body for receiving the threaded screw of a tripod. The present invention relates particularly to an improvement in such grip-type flash discharge devices.

SUMMARY OF THE INVENTION

One object of the present invention is to provide a grip type flash discharge device in which the time required for charging is reduced and the number of flash discharges possible prior to consumption of the source batteries is increased.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a grip-type photographic flash discharge device in one embodiment of the present invention comprises a main discharge capacitor for storing charge with which to effect discharge of the flash device; a grip portion provided with a first DC-DC converter and adapted to receive a first battery power source for activating the first DC-DC converter; a flash unit provided with a second DC-DC converter and adapted to receive a second battery power source for activating the second DC-DC converter, the flash unit being removably attachable to the grip portion; and electrical interconnection means for connecting the first and second DC-DC converters by attachment of said flash unit to said grip portion, said main discharge capacitor being chargeable by the cooperation of said connected converters.

Preferably, the electrical interconnection means comprises cooperating connecting terminals located on the flash unit and on the grip portion, the terminals on the flash unit making electrical contact with the terminals on the grip portion upon attachment of the flash unit to the grip portion.

In another aspect of the present invention, a source switch is included for disconnecting one of the first or second battery power sources from a corresponding one of the first and second DC-DC converters for charging of the main discharge capacitor exclusively by the other of the DC-DC converters when the flash unit is attached to the grip portion.

In yet another embodiment of the invention, the main discharge capacitor is located in the flash unit and the grip portion includes a safety switch for preventing operation of the first DC-DC converter when the flash unit is not attached to the grip portion.

With the arrangement described above, the time required for charging is shortened. Also, as batteries are loaded not only in the flash unit, but also in the grip portion, the total electric energy stored in the device as a whole is increased and the electric energy consumption per battery for each flash discharge is reduced. Therefore, the number of flash discharges which can occur before the electric energy stored in the batteries will be reduced to an unacceptable level is increased.

BRIEF DESCRIPTION OF THE DRAWINGS

The present invention will be now described in additional specificity and detail through use of the accompanying drawings in which.

DESCRIPTION OF THE PREFERRED EMBODIMENT

Figure 1:
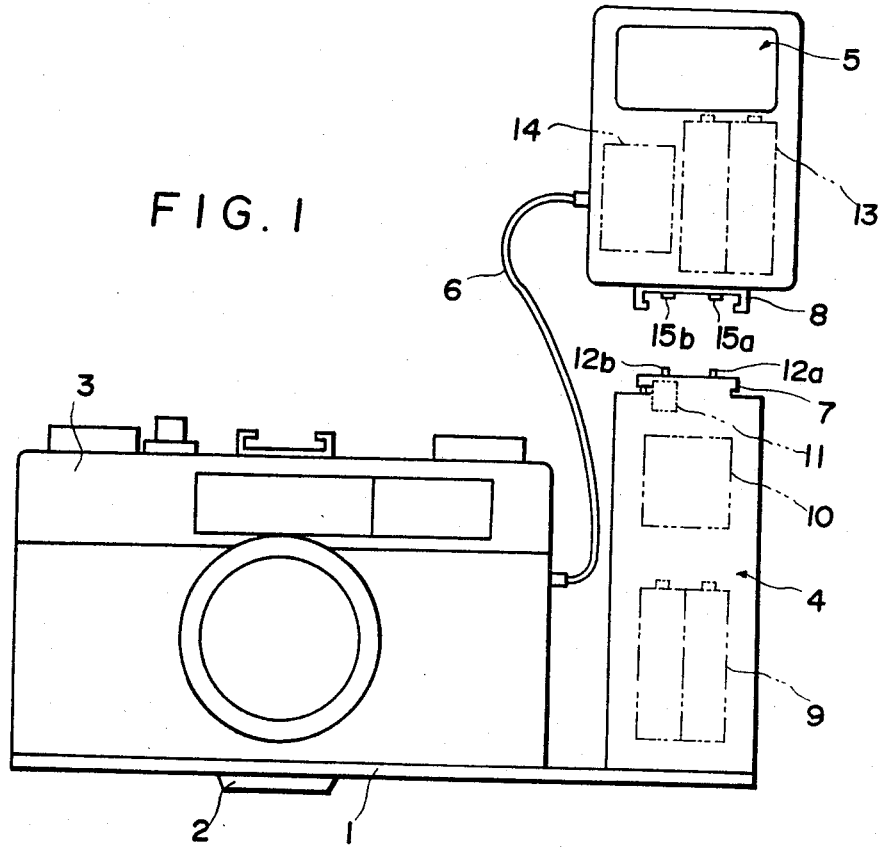
FIG. 1 is a front view of a grip-type flash discharge device embodying the present invention and mounted on a photographic camera.

Referring to FIG. 1, a flash discharge device embodying the teachings of the present invention is shown to include a mounting base plate 1 fixed by a clamp screw 2 to the bottom of a photographic camera 3. A grip portion 4 is attached upstanding from base plate 1, and a flash unit 5 is provided for detachable coupling to grip portion 4. Flash unit 5 is connected to camera 3 by a synchronizing cord 6.

When flash unit 5 is coupled to grip portion 4, a locking projection 7 formed on the upper end of grip portion 4 is engaged in a locking channel 8 on the bottom of flash unit 5 to achieve a secure attachment. Grip portion 4 contains a power source, shown for example as two batteries 9, and a DC-DC converter 10 adapted for activation by batteries 9. A safety switch 11 permits activation of DC-DC converter 10 only after flash unit 5 is coupled to grip portion 4. Grip portion 4 is further provided on locking projection 7 with a pair of protruding connecting terminals 12a, 12b connected to the output of DC-DC converter 10.

In addition to other known elements of flash units, flash unit 5 contains a power source, shown for example as two batteries 13, and a DC-DC converter 14 adapted for activation by batteries 13. Within locking channel 8, in opposition to the associated connecting terminals 12a, 12b of grip portion 4, are a pair of connecting terminals 15a, 15b connected to a main discharge capacitor 16 shown in FIG. 2.

In accordance with one aspect of the invention, means are provided for permitting two DC-DC converters, such as DC-DC converters 10, 14 located respectively in the grip portion and flash unit of a grip-type flash discharge device to both cooperate in charging a discharge capacitor for storing charge with which to effect discharge of the flash device. As described by way of example and not limitation, coupling of flash unit 5 to grip portion 4 causes connecting terminals 12a, 12b to make electric contact with connecting terminals 15a, 15b, respectively, thereby connecting DC-DC converter 10 to main discharge capacitor 16.

Figure 2:
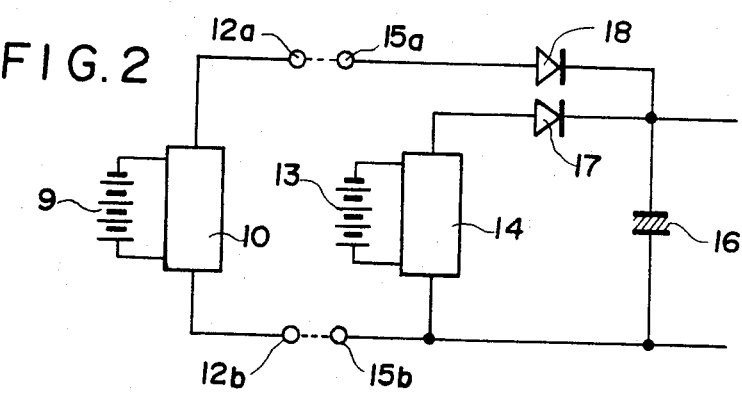
FIG. 2 is a schematic diagram of the electrical circuit established when the flash unit of the flash discharge device of FIG. 1 is coupled to the grip portion thereof.

FIG. 2 schematically illustrates the electrical circuit established when flash unit 5 is coupled to grip portion 4. Rectification diodes 17, 18 contained in flash unit 5 then become connected in series respectively with the output of DC-DC converters 14, 10. From this circuit diagram it will be apparent that main discharge capacitor 16 and other capacitors (not shown) contained in flash unit 5 are charged under cooperation of both DC-DC converters 10, 14. As a result, the time required to charge the capacitors to a level at which a flash discharge can occur is effectively shortened, and the power consumption from each battery per flash discharge is correspondingly reduced. Accordingly, the number of flash discharges which can be repeated before batteries 9, 13 are depleted below a predetermined value is increased.

As mentioned earlier, safety switch 11 prevents DC-DC converter 10 in grip portion 4 from oscillating when flash unit 5 is not coupled thereto. With flash unit 5 not coupled to grip portion 4, connecting terminals 12a, 12b are exposed and may be touched by a user. If DC-DC converter 10 is permitted to operate under such circumstances, a user inadvertently touching connecting terminals 12a, 12b could be dangerously shocked by the high voltage output from converter 10. Safety switch 11 thus serves to avoid such electric shock.

In the arrangement described above, a source switch 21 shown in FIG. 3 may be provided on grip portion 4 in association with batteries 9. Opening source switch 21 stops oscillation of the DC-DC converter 10 so that charging occurs only from the other DC-DC converter 14 contained in flash unit 5. Both DC-DC converter 10 and the electrical circuit incorporated into flash unit 5 may be based on known circuit arrangements, specific embodiments of which are illustrated in FIGS. 3 and 4.

Figure 3:
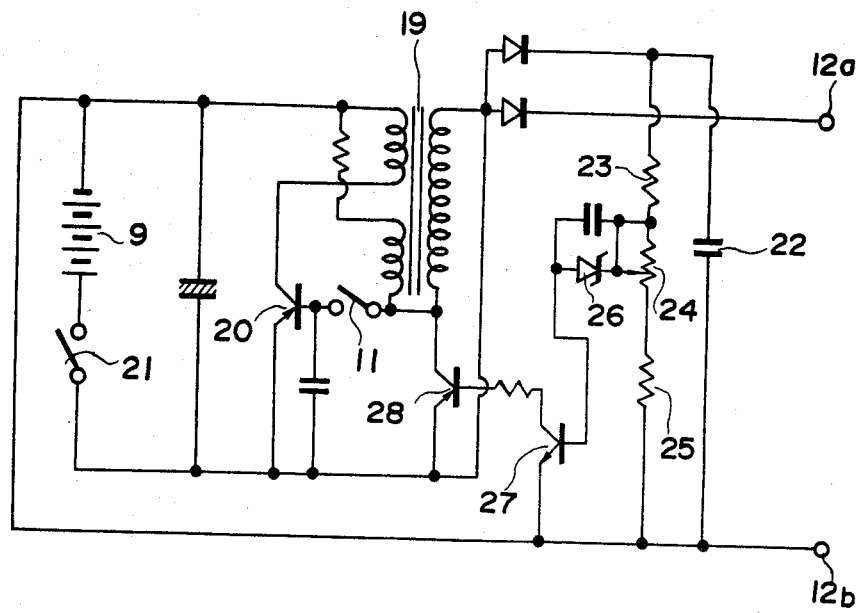
FIG. 3 is a circuit diagram of the DC-DC converter contained in the grip portion of the flash discharge device of FIG. 1.

FIG. 3 is a diagram of the circuit, including DC-DC converter 10, contained in grip portion 4. An oscillatory transformer 19 together with a transistor 20 forms the oscillation circuit of DC-DC converter 10, which oscillates when energized by batteries 9 upon closure of a source switch 21. The base of transistor 20 is coupled to safety switch 11 which is maintained in a normally opened condition. Safety switch 11 is closed upon the coupling of the flash unit 5 to grip portion 4, allowing DC-DC converter 10 to oscillate. A monitoring circuit constituting a capacitor 22, bleeder resistances 23, 24, 25, a Zener diode 26, and transistors 27, 28 interconnected as shown, detects when main discharge capacitor 16 in flash unit 5 has reached a predetermined voltage, thereupon to stop oscillation of DC-DC converter 10.

Figure 4:
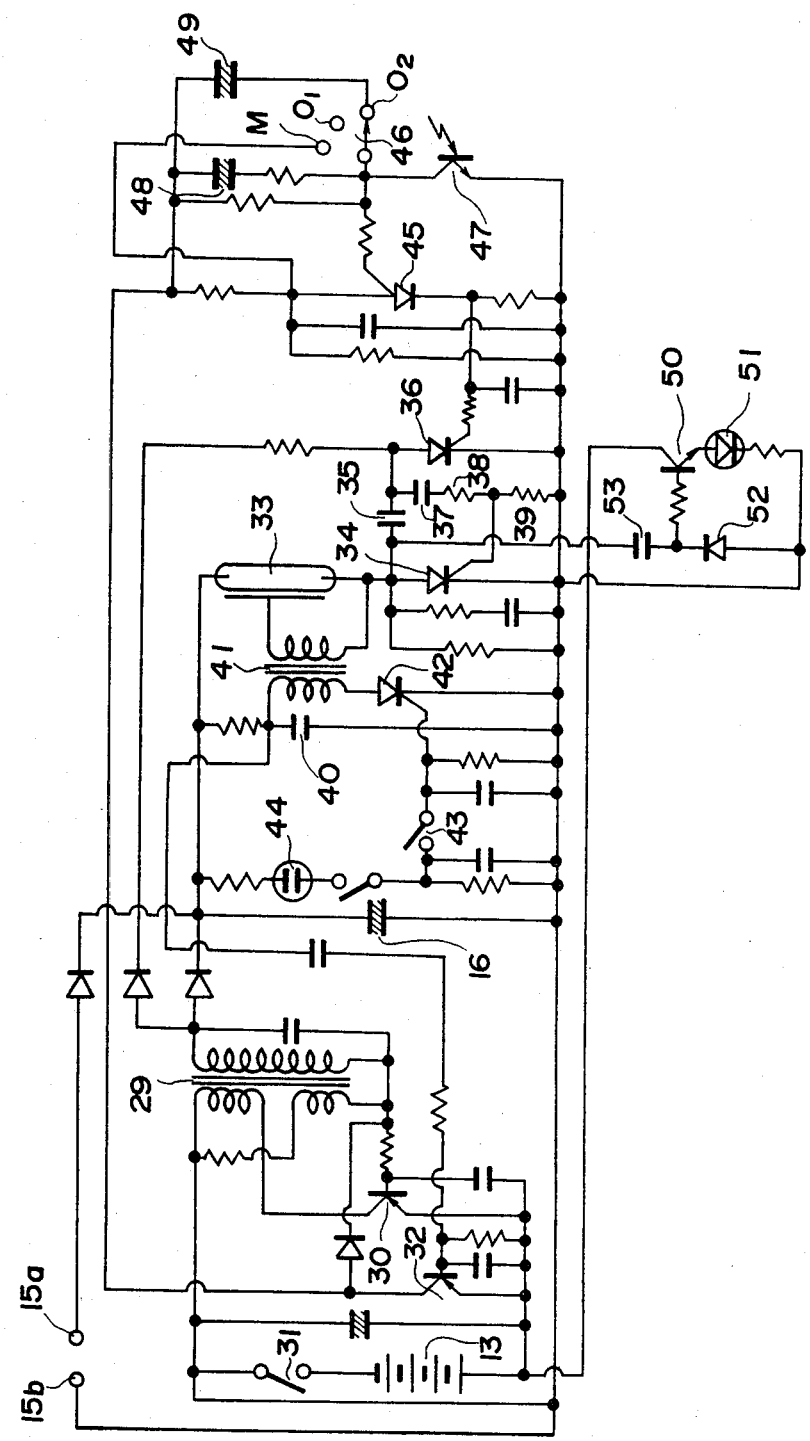
FIG. 4 is a circuit diagram of the electric circuit incorporated in the flash unit of the flash discharge device of FIG. 1.

FIG. 4 illustrates the electrical circuit incorporated in flash unit 5. An oscillatory transformer 29 together with a transistor 30 form the oscillation circuit of DC-DC converter 14, which oscillates when energized by batteries 13 upon closure of a source switch 31. A transistor 32 functions as a switch which is turned on to apply a voltage to a flash discharge control circuit in response to operation of a trigger circuit. Main discharge capacitor 16 is charged by DC-DC converter 14. Connecting terminals 15a, 15b are connected to main discharge capacitor 16 as illustrated.

It is known to connect a flash discharge tube 33 and an semiconductor-controlled rectifier 34 as a flash discharge circuit to main discharge capacitor 16, while a loop circuit consisting of semiconductor-controlled rectifier 34, a commutation capacitor 35, and another semiconductor-controlled rectifier 36, functions as a flash discharge stopping circuit. An impedance circuit consisting of a capacitor 37 and resistances 38, 39 is connected to the gate of semiconductor-controlled rectifier 34 to make semiconductor-controlled rectifier 34 conductive. A trigger capacitor 40, a trigger transformer 41, and a semiconductor-controlled rectifier 42 constitute a trigger circuit which performs trigger operation, in a known manner, when the semiconductor-controlled rectifier 42 is rendered conductive by closure of a synchronous switch 43. A charging confirmation neon lamp 44 is adapted to be lit when main discharge capacitor 16 has been charged to a level higher than a predetermined value.

A programmable unijunction transistor 45 functions as a comparator adapted to activate the flash discharge stopping circuit when a preselected relationship is established between voltages applied by transistor 32 and a phototransistor 47. A photometric voltage is generated by closing a change-over switch 46 against one of terminals $O_1$, $O_2$. In the case of closure of change-over switch 46 on terminal $O_2$, as illustrated for example, signals photoelectrically converted by the phototransistor 47 are integrated in integrating capacitors 48, 49. In the case of closure of change-over switch on terminal $O_1$, the photoelectrically converted signals are integrated only by the integrating capacitor 48 to generate the corresponding photometric voltage. Closure of the change-over switch 46 on a terminal M results in a manual flash discharge.

A transistor 50, a light emitting diode 51, a diode 52, and a capacitor 53 constitute a display circuit for confirming operation of the flash discharge control circuit. The display circuit so functions that, when semiconductor-controlled rectifier 36 is made conductive, electric charge from commutation capacitor 35 is discharged through semiconductor-controlled rectifier 36 and diode 52 to charge capacitor 53, thereby turning on transistor 50 and activating light emitting diode 51.

In a flash discharge device according to the present invention, as described above, charging operation takes place under cooperation of a first DC-DC converter arranged in the flashing unit and a second DC-DC converter arranged in the grip portion. This feature reduces the time required for charging in comparison with that of known devices by approximately half. Also, this feature substantially doubles the number of times the flash may discharge before the electric energy stored in the batteries is reduced below a predetermined value. Since power source batteries are loaded not only in the flashing unit, but also in the grip portion, the electric energy consumed per battery by each flash discharge is corresponding reduced.

It should be understood that, although in the embodiment depicted in FIG. 1 grip portion 4 is provided with locking projection 7, while flashing unit 5 is provided with locking channel 8, locking channel 8 may be located on grip portion 4 if locking correspondingly projection 7 is on flash unit 5.

Locking channel 8 as shown is slidably engaged over locking projection 7 from the front or rear thereof. The present invention, however, is not limited to coupling means comprising a locking projection and cooperating locking channel. The adaption of known means, such as a screw connection, is within the scope of the invention. It is further possible to load a number of batteries 9 in grip portion 4, while a different number batteries 13 are loaded in flash unit 4, so long as the output voltages from the first and second DC-DC converters are set to the same level.

It will be apparent to those skilled in the art that modifications and variations can be made in the apparatus of this invention. The invention in its broader aspect is, therefore, not limited to the specific details, representative methods and apparatuses, and illustrative examples shown and described. Accordingly, alterations may be made from such details without departing from the spirit or scope of Applicant's general inventive concept.

What is claimed is:

1. A grip portion type photographic flash discharge device, comprising:
   a. a main discharge capacitor for storing charge with which to effect discharge of said flash device;
   b. a grip portion provided with a first DC-DC converter and adapted to receive a first battery power source for activating said first DC-DC converter;
   c. a flash unit provided with a second DC-DC converter and adapted to receive a second battery source for activating said second DC-DC converter, said flash unit being removably attachable to said grip portion; and
   d. electrical interconnection means for connecting said first and second DC-DC converters by attachment of said flash unit to said grip portion, said main discharge capacitor being chargeable by the cooperation of said connected converters.

2. A flash discharge device as recited in claim 1, wherein said electrical interconnection means comprises connecting terminals located on said flash unit and on said grip portion, said terminals on said flash unit cooperating with said terminals on said grip portion to establish electrical contact therebetween upon attachment of such flash unit to said grip portion.

3. A photographic flash discharge device as recited in claim 2, wherein said main discharge capacitor is located in said flash unit and said grip portion includes a safety switch for preventing operation of said first DC-DC converter whenever said flash unit is not attached to said grip portion.

4. A photographic flash discharge device as recited in claim 1, further including a source switch for disconnecting one of said first or second battery power sources from a corresponding one of said first and second DC-DC converters for charging of said main discharge capacitor exclusively by the other of said DC-DC converters with said flash unit attached to said grip portion.

* * * * *